United States Patent
Kanai

(10) Patent No.: US 7,468,841 B2
(45) Date of Patent: Dec. 23, 2008

(54) ZOOM LENS AND IMAGE PICKUP APPARATUS

(75) Inventor: Makoto Kanai, Tokyo (JP)

(73) Assignee: Sony Corporation (JP)

( * ) Notice: Subject to any disclaimer, the term of this patent is extended or adjusted under 35 U.S.C. 154(b) by 69 days.

(21) Appl. No.: 11/711,761

(22) Filed: Feb. 28, 2007

(65) Prior Publication Data

US 2007/0206294 A1    Sep. 6, 2007

(30) Foreign Application Priority Data

Mar. 1, 2006   (JP) .............................. 2006-054661

(51) Int. Cl.
*G02B 27/64* (2006.01)
(52) U.S. Cl. .................. 359/557; 359/554; 359/689; 359/813; 396/55; 348/208.11
(58) Field of Classification Search ................ 359/554, 359/557, 689, 813; 396/55; 348/208.11
See application file for complete search history.

(56) References Cited

U.S. PATENT DOCUMENTS 7,023,623 B2 *   4/2006   Miyatake et al. ............ 359/676

FOREIGN PATENT DOCUMENTS

WO    WO-03/085440    10/2003

* cited by examiner

*Primary Examiner*—Joseph Martinez
(74) *Attorney, Agent, or Firm*—Rader Fishman & Grauer PLLC; Ronald P. Kananen

(57) ABSTRACT

A zoom lens includes a first lens group having a negative refractive power, and second and third lens groups each having a positive refractive power, sequentially aligned from an object side. The first lens group is moved along an optical axis and the second lens group is moved along the optical axis toward the object side, during zooming from a wide-angle end state to a telescopic end state. The third lens group includes a negative sub-lens group having a negative refractive power, and a positive sub-lens group having a positive refractive power, sequentially aligned from the object side. Moving the positive sub-lens group orthogonally to the optical axis causes image shifting. The zoom lens satisfies a conditional expression (1): $0.3 < 1 - \beta < 2.5$, where $\beta$ is a magnification of the positive sub-lens group at the telescopic end state.

5 Claims, 17 Drawing Sheets

ZOOM LENS AND IMAGE PICKUP APPARATUS

CROSS REFERENCES TO RELATED APPLICATIONS

The present invention contains subject matter related to Japanese Patent Application JP 2006-054661 filed in the Japanese Patent Office on Mar. 1, 2006, the entire contents of which are incorporated herein by reference.

BACKGROUND OF THE INVENTION

1. Field of the Invention

The present invention relates to a new zoom lens and a new image pickup apparatus. In particular, the present invention relates to a zoom lens having an image stabilization function suitable for apparatuses, such as digital video cameras and digital still cameras, and to an image pickup apparatus using the zoom lens.

2. Description of the Related Art

In recent years, digital video cameras and digital still cameras utilizing solid-state image pickup devices have achieved high optical characteristics and have been miniaturized, and hence, zoom lenses applied to such apparatuses also have been desired to be small and have high optical characteristics. In addition, an image stabilization function has been strongly desired for avoiding image blur of a shooting image due to vibration caused by a camera shake and the like.

There have been various types of zoom lenses having such an image stabilization function for correcting the image blur caused by the vibration at the shooting.

For example, Japanese Unexamined Patent Application Publication No. 2003-582569 suggests a zoom lens including a first lens group having a negative refractive power, a second lens group having a positive refractive power, and a third lens group having a positive refractive power, and stabilizing an image by moving the second lens group in a direction orthogonal to the optical axis of the zoom lens.

Also, there is disclosed a zoom lens including a first lens group having a negative refractive power, a second lens group having a positive refractive power, and a third lens group having a negative refractive power, and stabilizing an image by moving the third lens group in the direction orthogonal to the optical axis.

Further, there is disclosed a zoom lens including a first lens group having a negative refractive power and a second lens group having a positive refractive power, the second lens group being divided into a positive front group and a positive rear group, and stabilizing an image by moving the front or rear group in the direction orthogonal to the optical axis.

SUMMARY OF THE INVENTION

However, in the zoom lens disclosed in the aforementioned publication, the second lens group, which is a zoom group, is entirely shifted (moved) in the direction orthogonal to the optical axis as an image stabilization group. Owing to this, a driving system for driving the second lens group by a distance for correcting the camera shake is requested so as to be controlled highly accurately especially at a telescope end state, thereby increasing the cost.

Also, in the zoom lens in which the third lens group is entirely shifted as the image stabilization lens group, the number of lenses of the image stabilization lens group is large and the weight thereof is also large, thereby increasing the load to be applied to a deflection driving system that shifts the image stabilization lens group.

Further, the zoom lens capable of stabilizing an image by way of the known three-lens groups only achieves a zoom ratio of approximately 2. This may not meet the demands of users who want a zoom ratio of 3 or higher.

Accordingly, it is desirable to provide a compact zoom lens having a zoom ratio of 3 or higher with an image stabilization function suitable for an imaging optical system of an image pickup apparatus, such as a digital still camera and a digital video camera, and also provide an image pickup apparatus using the zoom lens.

A zoom lens according to an embodiment of the present invention includes a first lens group having a negative refractive power, a second lens group having a positive refractive power, and a third lens group having a positive refractive power, the lens groups being sequentially aligned from an object side, The zoom lens has the following configurations. The first lens group is moved along an optical axis of the zoom lens and the second lens group is moved along the optical axis toward the object side during zooming from a wide-angle end state to a telephoto end state. The third lens group includes a negative sub-lens group having a negative refractive power and a positive sub-lens group having a positive refractive power, the sub-lens groups being sequentially aligned from the object side. An image may be shifted by moving the positive sub-lens group in a direction orthogonal to the optical axis. Also, the following conditional expression (1) is satisfied, (1) $0.3 < 1-\beta < 2.5$, where $\beta$ is a magnification of the positive sub-lens group of the third lens group at the telephoto end state.

An image pickup apparatus according to another embodiment of the present invention includes the zoom lens according to the above-mentioned embodiment of the present invention and an image pickup device that converts an optical image produced by the zoom lens into an electric signal.

With such a configuration, the zoom lens may stabilize an image by three-lens groups, and also, it may be miniaturized while achieving a zoom ratio of 3 or higher.

DESCRIPTION OF THE PREFERRED EMBODIMENTS

Figure 1:
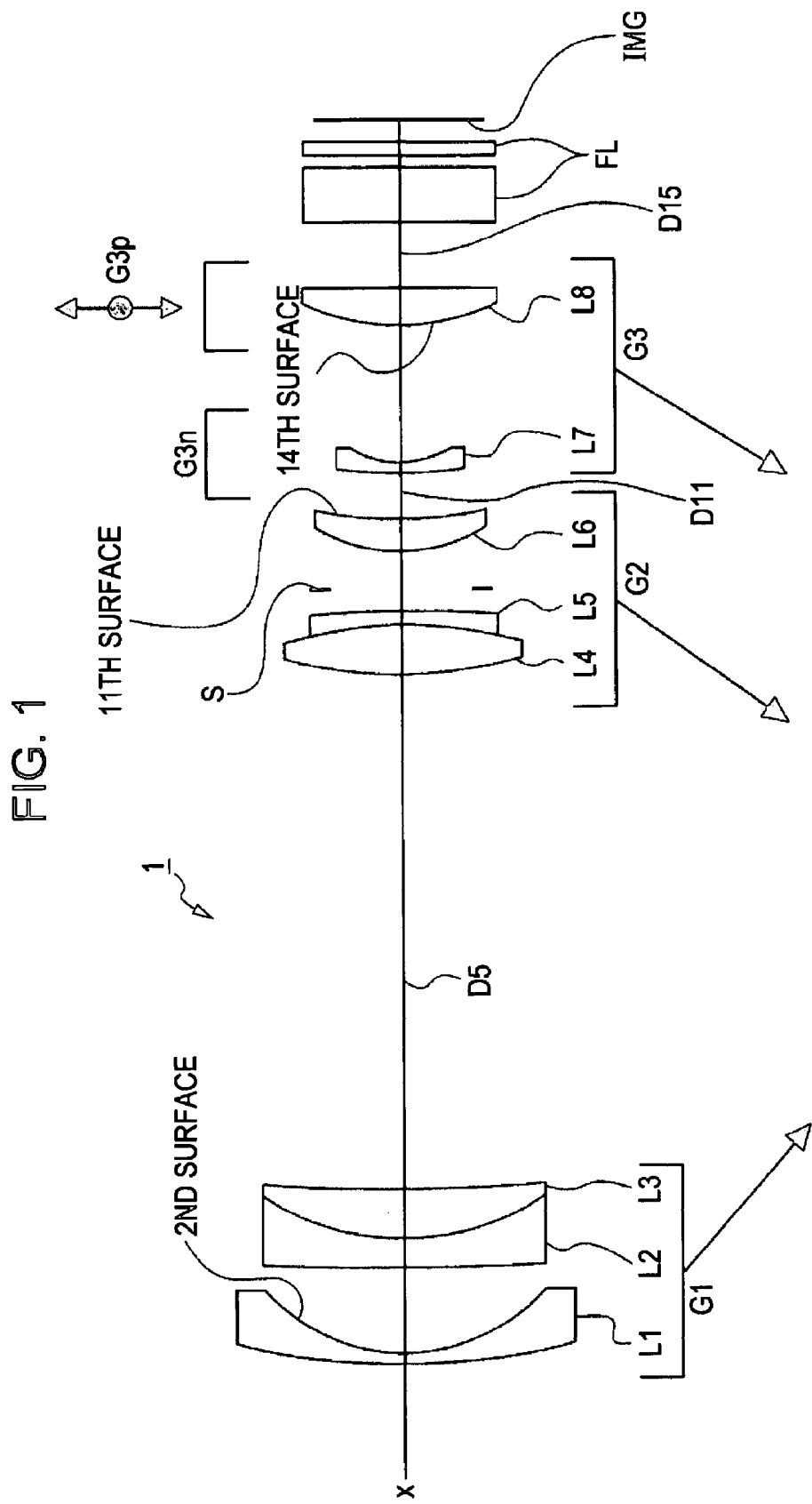
FIG. 1 is an illustration showing a lens arrangement of a zoom lens according to a first embodiment of the present invention.

Exemplary embodiments of a zoom lens and an image pickup apparatus according to the present invention will be described below with reference to the attached drawings.

A zoom lens according to an embodiment of the present invention includes a first lens group having a negative refractive power, a second lens group having a positive refractive power, and a third lens group having a positive refractive power, the lens groups being sequentially aligned from an object side. The first lens group is moved along an optical axis of the zoom lens, and the second lens group is moved along the optical axis toward the object side during zooming from a wide-angle end state to a telephoto end state. The third lens group includes a negative sub-lens group having a negative refractive power, and a positive sub-lens group having a positive refractive power, the sub-lens groups being sequentially aligned from the object side. An image may be shifted by moving the positive sub-lens group in a direction orthogonal to the optical axis. Also, the following conditional expression (1) is satisfied, $$0.3 < 1-\beta < 2.5, \quad (1)$$

where $\beta$ is a magnification of the positive sub-lens group of the third lens group at the telephoto end state.

In the zoom lens according to the embodiment of the present invention, the final third lens group is divided into the positive sub-lens group and the negative sub-lens group, and the positive sub-lens group serves as an image stabilization lens group that is shifted in the direction orthogonal to the optical axis. With such an arrangement, an image stabilization driving system for shifting the image stabilization lens group may be disposed at a position closest to the image side, the area being relatively vacant. Accordingly, the interference between the image stabilization driving system and other driving systems, such as a shutter and iris unit driving system and a zoom driving system, may be minimized.

Typically, zooming may be performed by using a first lens group and the negative and positive sub-lens groups of the third lens group. In the zoom lens according to the embodiment of the present invention, the use of the negative sub-lens group for zooming may eliminate the interference between the zoom driving system and the image stabilization driving system, thereby promoting miniaturization of the zoom lens.

The above-mentioned conditional expression (1) defines a proportion of a shift amount of an image in the direction orthogonal to the optical axis relative to a moving distance of the image stabilization lens group in the direction orthogonal to the optical axis. When a value is below the lower limit of the conditional expression (1), the moving distance of the image stabilization lens group necessary for shifting the image by a predetermined amount is increased. As a result, the driving system for shifting the image stabilization lens group becomes large, thereby resulting in an increase in size. When a value is above the upper limit of the conditional expression (1), since the shift amount of the image relative to the moving distance of the image stabilization lens group is increased as described above, it is necessary to control the moving distance of the image stabilization lens group highly accurately. Due to this, parts tolerance and assembly precision, as well as accurate control of a detecting system and a driving system are necessary, thereby making the cost extremely high.

In addition, with such a zoom lens, the image stabilization may be performed by entirely shifting the second lens group in the direction orthogonal to the optical axis. However, since the variation in magnification mainly relies upon the variation in magnification of the second lens group, the value may be above the upper limit of the conditional expression (1) especially, at the telescope end state, to attain a zoom ratio of 3 or higher. With the zoom lens according to the embodiment of the present invention, the image stabilization is performed by moving (shifting) the positive sub-lens group of the third lens group in the direction orthogonal to the optical axis. Since the variation in magnification of the positive sub-lens group is small, the zoom ratio may be 3 or higher without the value being above the upper limit of the conditional expression (1).

In the zoom lens according to the embodiment of the present invention, the negative sub-lens group of the third lens group may satisfy the following conditional expression (2), $$1.0 < Rn/fw < 1.5, \quad (2)$$

where Rn is a curvature radius of a lens surface closest to the image side of the negative sub-lens group of the third lens group, and fw is a focal length of the whole lens system at the wide-angle end state.

The conditional expression (2) defines a surface profile closest to the image side of the negative sub-lens group of the third lens group. When a value is below the lower limit of the conditional expression (2), i.e., when a curvature radius of a surface closest to the image side of the negative sub-lens group is decreased and an effect for diverging a light beam emitted from the negative sub-lens group becomes small, it is necessary to increase the distance between the negative sub-lens group and the positive sub-lens group for providing effective telecentricity at the positive sub-lens group, and hence, it may be difficult to miniaturize the whole optical system. When the value is above the upper limit of the conditional expression (2), i.e., when the effect for diverging the light beam becomes too large, the power of the positive sub-lens group also becomes large. Accordingly, it may be difficult to correct spherical aberration and coma, and the aberration variance in the image stabilization becomes large.

In the zoom lens according to the embodiment of the present invention, the positive sub-lens group of the third lens group may satisfy the following conditional expression (3), $$-1.0 < (CF+CR)/(CF-CR) < 0, \qquad (3)$$

where CF is a curvature radius of a lens surface closest to the object side of the positive sub-lens group of the third lens group, and CR is a curvature radius of a lens surface closest to the image side of the positive sub-lens group of the third lens group.

The conditional expression (3) defines a profile of the image stabilization lens group. When a value is below the lower limit of the conditional expression (3), i.e., when CF is relatively small, it may be difficult to correct distortion and variation in an image plane occurring in the image stabilization. When the value is above the upper limit of the conditional expression (3), i.e., CF is relatively large, it may be difficult to miniaturize the optical system.

In the zoom lens according to the embodiment of the present invention, the positive sub-lens group of the third lens group may include a positive lens. Accordingly, the load applied to a driving system for shifting the positive sub-lens group (image stabilization lens group) of the third lens group in the direction orthogonal to the optical axis may be reduced, thereby realizing the miniaturization of the driving system and reducing power consumption.

Next, specific embodiments of the zoom lens according to the present invention and numerical examples in which specific numerical values are applied to embodiments will be described below.

Note that the profile of an aspherical surface according to each numerical example is defined by the $$x = \frac{y^2 \cdot c^2}{1 + (1 - (1+K) \cdot y^2 \cdot c^2)^{1/2}} + \sum Ai \cdot y^i$$

following first expression:

where x is a distance along the optical axis from a lens vertex, y is a height in a direction orthogonal to the optical axis, c is a paraxial curvature at the lens vertex, K is a conic constant, and Ai is an aspherical coefficient at an i-th order.

Each of the zoom lenses according to the following four embodiments having an image stabilization function includes a first lens group G1 having a negative refractive power, a second lens group G2 having a positive refractive power, and a third lens group G3 having a positive refractive power, the lens groups being sequentially aligned from an object side. Each group is moved such that an airspace between the first lens group G1 and the second lens group G2 is decreased and an airspace between the second lens group G2 and the third lens group G3 is increased during zooming from a wide-angle end state to a telephoto end state.

FIG. 1 is an illustration showing a lens arrangement of a zoom lens 1 according to a first embodiment. A first lens group G1 includes a negative meniscus lens L1 having an aspherical surface at the image side and a convex surface at the object side and a cemented lens of a negative meniscus lens L2 having a convex surface at the object side and a positive meniscus lens L3 having a concave surface at the image side, the lenses being sequentially aligned from the object side. A second lens group G2 includes a cemented lens of a biconvex lens L4 and a negative meniscus lens L5 having a convex surface at the image side and a positive meniscus lens L6 having an aspherical surface at the image side and a convex surface at the object side the lenses being sequentially aligned from the object side. A third lens group G3 includes a negative meniscus lens L7 having a convex surface at the object side, and a biconvex lens L8 having an aspherical surface at the object side, the lenses being sequentially aligned from the object side. In the third lens group G3, the negative meniscus lens L7 defines a negative sub-lens group G3n and the biconvex lens L8 defines a positive sub-lens group G3p. As the positive sub-lens group G3p is shifted in a direction orthogonal to an optical axis x of the zoom lens 1, an image may be shifted.

An aperture stop S is disposed between the negative meniscus lens L5 and the positive meniscus lens L6 of the second lens group G2. Filters FL, such as a low pass filter and an infrared cut filter, are disposed between the third lens group G3 and an image plane IMG.

Table 1 shows specific values of a first numerical example in which specific numerical values are applied to the first embodiment. In the following tables for specific values, "Surface No." represents an i-th surface counted from the object side, "R" represents a paraxial curvature radius of the i-th surface, "D" represents an on-axis surface distance between the i-th surface and an i+1-th surface, "Nd" represents a refractive index of the surface relative to the d-line ($\lambda$=587.6 nm), and "vd" represents an Abbe number of the surface relative to the d-line. In "R", "INF" represents that the surface is a flat surface, and "ASP" represents that the surface is an aspherical surface.

TABLE 1

| Surface No. | R | D | Nd | vd |
|---|---|---|---|---|
| 1 | 27.812 | 0.550 | 1.80610 | 40.7 |
| 2 | 7.738 ASP | 3.752 | | |
| 3 | 241.733 | 1.274 | 1.74330 | 49.2 |
| 4 | 10.925 | 2.243 | 1.80518 | 25.5 |
| 5 | 54.912 | D5 | | |
| 6 | 18.364 | 2.217 | 1.72916 | 54.7 |
| 7 | −14.861 | 0.450 | 1.90366 | 29.5 |
| 8 | −36.692 | 1.000 | | |
| 9 | Aperture Stop | 1.716 | | |
| 10 | 6.410 ASP | 1.449 | 1.58913 | 61.3 |
| 11 | 20.266 | D11 | | |
| 12 | 11.379 | 0.555 | 1.80518 | 25.5 |
| 13 | 4.729 | 6.013 | | |
| 14 | 8.829 ASP | 1.657 | 1.48749 | 70.4 |
| 15 | −97.206 | D15 | | |
| 16 | INF | 2.300 | 1.51680 | 64.2 |
| 17 | INF | 0.700 | | |
| 18 | INF | 0.500 | 1.51680 | 64.2 |
| 19 | INF | 1.000 | | |
| 20 | INF | | | |

A surface distance D5 between the first lens group G1 and the second lens group G2, a surface distance D11 between the second lens group G2 and the third lens group G3, and a surface distance D15 between the third lens group G3 and the filters FL, are varied during zooming from the wide-angle end state to the telephoto end state. Table 2 shows values of the variable distances at a wide-angle end state (f=5.50), an intermediate zoom position (f=7.72), and a telephoto end state (f=15.40), together with F-numbers Fno, focal lengths f and half-field angles ω.

TABLE 2

| Fno. | 2.84 | 3.11 | 4.03 |
|---|---|---|---|
| f | 5.50 | 7.72 | 15.40 |
| ω | 33.43 | 25.09 | 13.12 |
| D5 | 22.771 | 13.469 | 1.941 |
| D11 | 1.914 | 2.163 | 3.348 |
| D15 | 2.940 | 5.066 | 11.624 |

A 2nd surface, a 10th surface, and a 14th surface each have an aspherical surface. Table 3 shows aspherical coefficients A4, A6, A8 and A10 at a 4th order, a 6th order, an 8th order and a 10th order of each surface, together with conic constants K. Note that in Table 3 and the following tables showing the aspherical coefficients, "E-i" represents an exponent based on 10, namely, it represents "$10^{-i}$". For instance, "0.26029E-05" represents "$0.26029 \times 10^{-5}$".

TABLE 3

| Surface No. | | | |
|---|---|---|---|
| 2 | K = 0.00000E+00 | A4 = −1.20866E−04 | A6 = −2.49428E−06 |
| | A8 = 2.30481E−08 | A10 = −.23179E−09 | |
| 10 | K = 0.00000E+00 | A4 = −1.05604E−04 | A6 = −4.49991E−06 |
| | A8 = 1.72248E−07 | A10 = −1.05206E−08 | |
| 14 | K = 0.00000E+00 | A4 = −1.42896E−04 | A6 = 3.23388E−07 |
| | A8 = −3.46717E−08 | A10 = 8.34113E−10 | |

Figure 2:
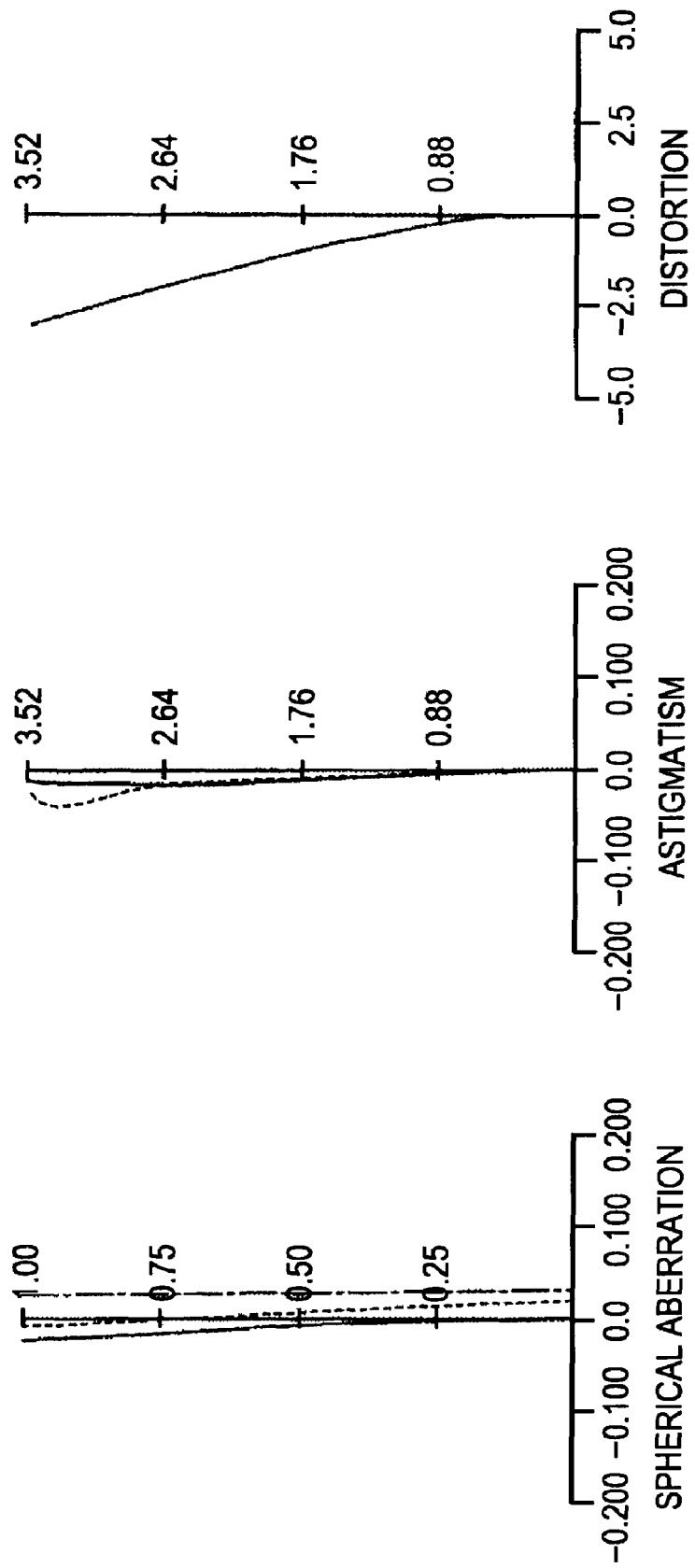
FIG. 2 illustrates aberration diagrams of spherical aberration, astigmatism and distortion at a wide-angle end state according to a first numerical example in which specific numerical values are applied to the zoom lens according to the first embodiment of the present invention.
Figure 3:
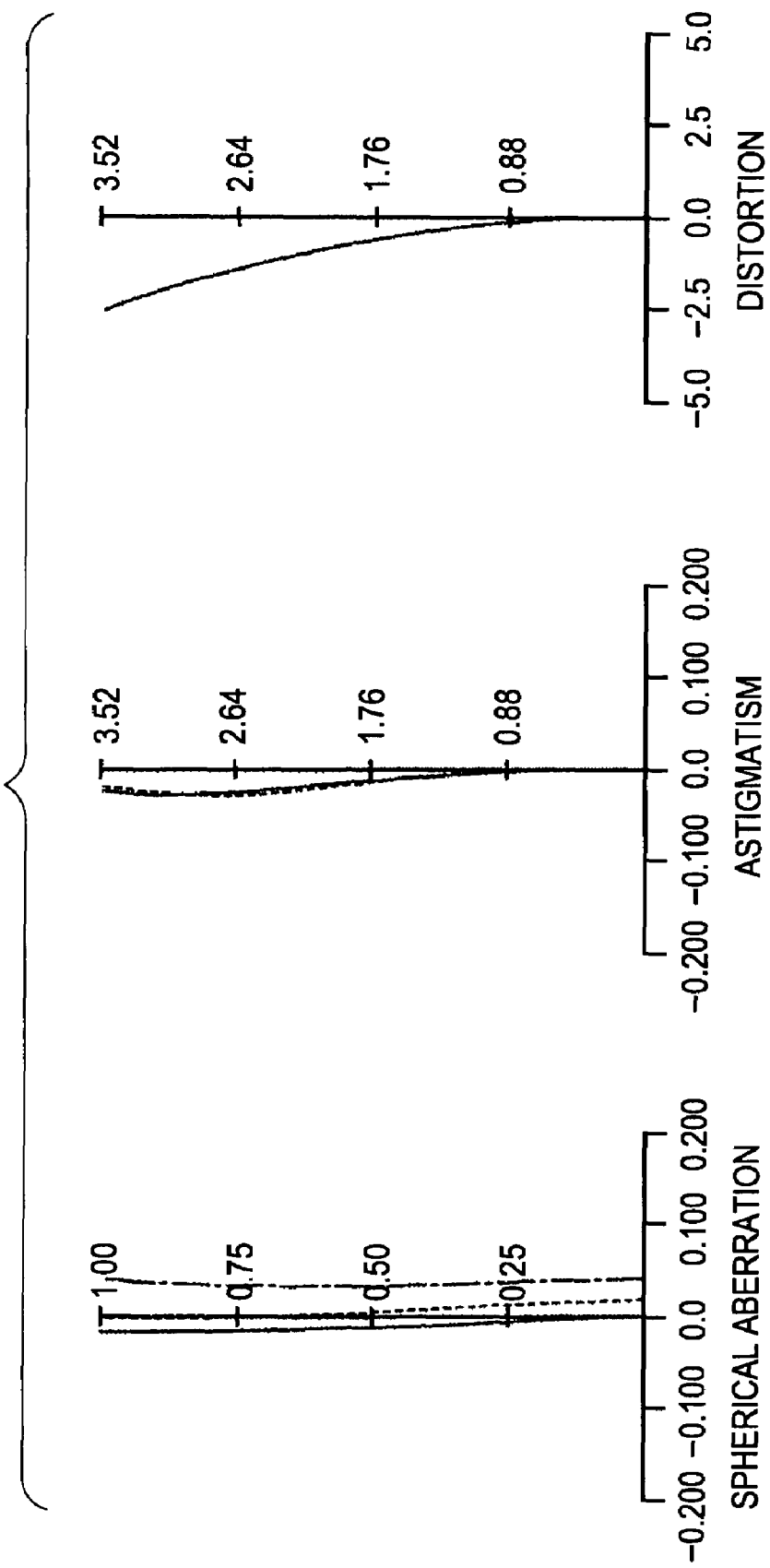
FIG. 3 illustrates aberration diagrams of spherical aberration, astigmatism and distortion at an intermediate zoom position according to the first numerical example.
Figure 4:
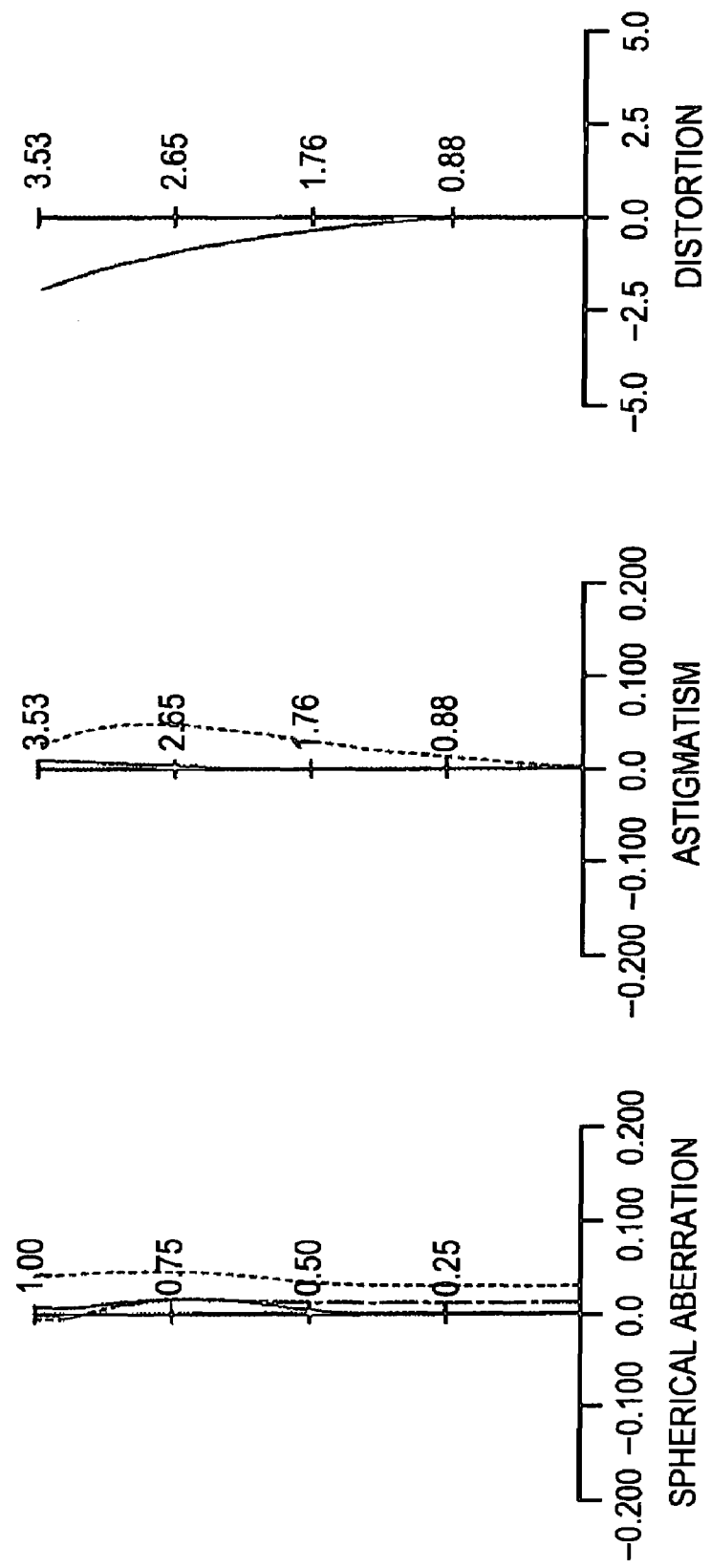
FIG. 4 illustrates aberration diagrams of spherical aberration, astigmatism and distortion at a telephoto end state according to the first numerical example.

FIGS. 2, 3 and 4 show aberration diagrams at infinity according to the first numerical example. FIG. 2 illustrates aberration diagrams at the wide-angle end state (f=5.50), FIG. 3 illustrates aberration diagrams at the intermediate zoom position (f=7.72), and FIG. 4 illustrates aberration diagrams at the telephoto end state (f=15.40).

In each of FIGS. 2, 3 and 4, the spherical aberration curves are plotted by a solid line for the d-line, a broken line for the C-line, and a dotted-chain line for the g-line. The astigmatism curves are plotted by a solid line for a sagittal image surface and a broken line for a meridional image surface.

Figure 5:
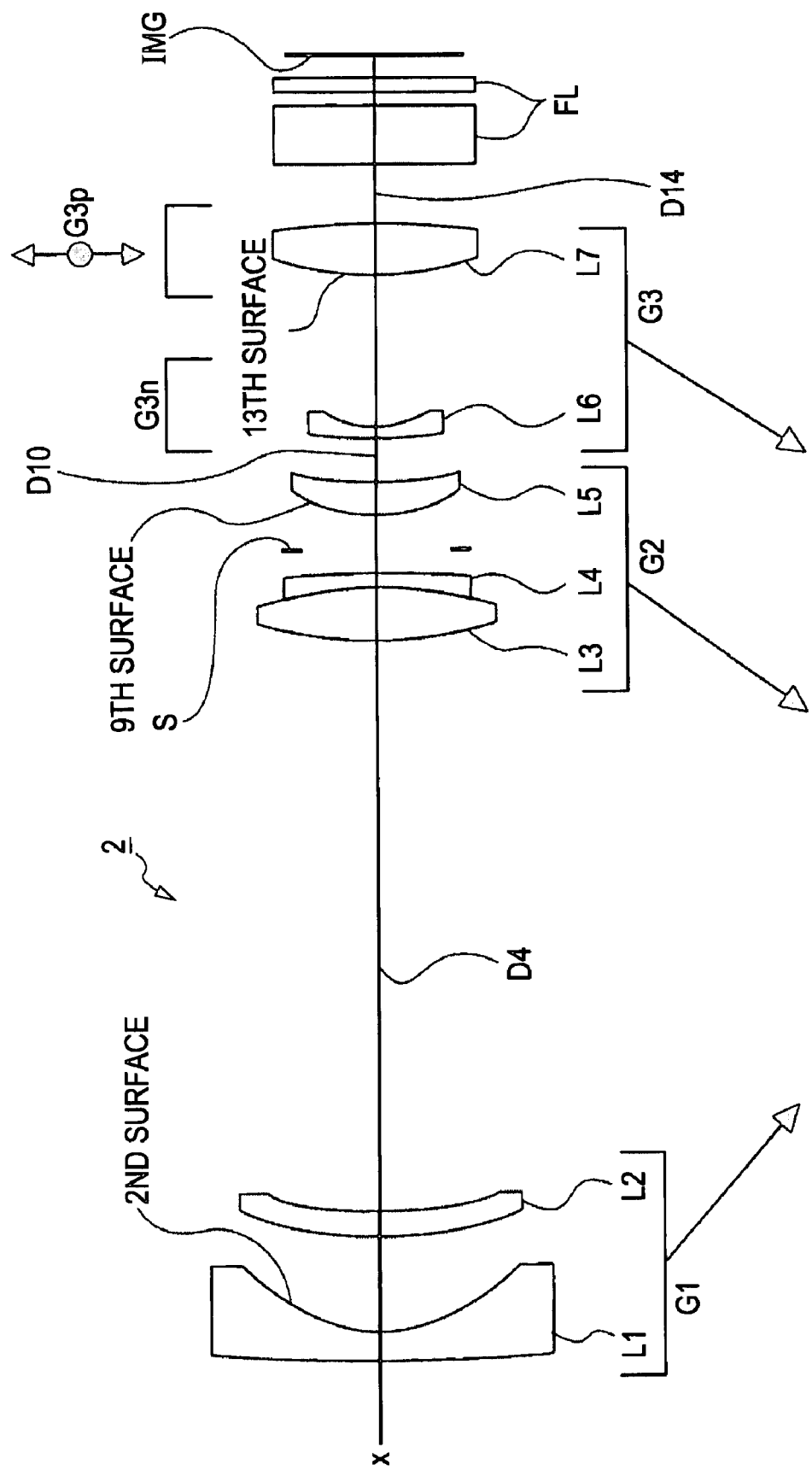
FIG. 5 is an illustration showing a lens arrangement of a zoom lens according to a second embodiment of the present invention.

FIG. 5 is an illustration showing a lens arrangement of a zoom lens 2 according to a second embodiment. A first lens group G1 includes a negative meniscus lens L1 having an aspherical surface at the image side and a convex surface at the object side and a positive meniscus lens L2 having a convex surface at the object side, the lenses being sequentially aligned from the object side. A second lens group G2 includes a cemented lens of a biconvex lens L3 and a negative meniscus lens L4 having a convex surface at the image side and a positive meniscus lens L5 having an aspherical surface at the image side and a convex surface at the object side, the lenses being sequentially aligned from the object side. A third lens group G3 includes a negative meniscus lens L6 having a convex surface at the object side and a biconvex lens L7 having an aspherical surface at the object side, the lenses being sequentially aligned from the object side. In the third lens group G3, the negative meniscus lens L6 defines a negative sub-lens group G3n and the biconvex lens L7 defines a positive sub-lens group G3p. As the positive sub-lens group G3p is shifted in a direction orthogonal to an optical axis x of the zoom lens 2, an image may be shifted.

An aperture stop S is disposed between the negative meniscus lens L4 and the positive meniscus lens L5 of the second lens group G2. Filters FL, such as a low pass filter and an infrared cut filter, are disposed between the third lens group G3 and an image plane IMG.

Table 4 shows specific values of a second numerical example in which specific numerical values are applied to the second embodiment.

TABLE 4

| Surface No. | R | D | Nd | vd |
|---|---|---|---|---|
| 1 | 117.681 | 1.200 | 1.74330 | 49.2 |
| 2 | 6.852 ASP | 3.885 | | |
| 3 | 14.860 | 1.227 | 1.92286 | 20.9 |
| 4 | 21.928 | D4 | | |
| 5 | 16.611 | 2.185 | 1.71300 | 53.9 |
| 6 | −15.213 | 0.450 | 1.83400 | 37.3 |
| 7 | −42.322 | 1.000 | | |
| 8 | INF | 1.544 | | |
| 9 | 6.642 ASP | 1.354 | 1.58913 | 61.3 |
| 10 | 24.423 | D10 | | |
| 11 | 13.974 | 0.508 | 1.84666 | 23.8 |
| 12 | 5.032 | 6.268 | | |
| 13 | 10.513 ASP | 2.253 | 1.51680 | 64.2 |
| 14 | −38.596 | D14 | | |
| 15 | INF | 2.300 | 1.51680 | 64.2 |
| 16 | INF | 0.700 | | |
| 17 | INF | 0.500 | 1.51680 | 64.2 |
| 18 | INF | 1.000 | | |
| 19 | INF | | | |

A surface distance D4 between the first lens group G1 and the second lens group G2, a surface distance D10 between the second lens group G2 and the third lens group G3, and a surface distance D14 between the third lens group G3 and the filters FL are varied during zooming from the wide-angle end state to the telephoto end state. Table 5 shows values of the variable distances at a wide-angle end state (f=5.80), an intermediate zoom position (f=8.08), and a telephoto end state (f=16.24), together with F-numbers Fno, focal lengths f and half-field angles ω.

TABLE 5

| Fno. | 2.89 | 3.14 | 4.00 |
|---|---|---|---|
| f | 5.80 | 8.08 | 16.24 |
| ω | 32.31 | 24.08 | 12.43 |
| D4 | 24.165 | 14.007 | 1.000 |
| D10 | 1.913 | 2.087 | 2.937 |
| D14 | 2.550 | 4.691 | 11.690 |

A 2nd surface, a 9th surface, and a 13th surface each have an aspherical surface. Table 6 shows aspherical coefficients A4, A6, A8 and A10 at a 4th order, a 6th order, an 8th order and a 10th order of each surface, together with conic constants K.

TABLE 6

| Surface No. | | | |
|---|---|---|---|
| 2 | K = 0.00000E+00 | A4 = −1.20866E−04 | A6 = −2.49428E−06 |
| | A8 = 2.30481E−08 | A10 = −.23179E−09 | |
| 10 | K = 0.00000E+00 | A4 = −1.05604E−04 | A6 = −4.49991E−06 |
| | A8 = 1.72248E−07 | A10 = −1.05206E−08 | |
| 14 | K = 0.00000E+00 | A4 = −1.42896E−04 | A6 = 3.23388E−07 |
| | A8 = −3.46717E−08 | A10 = 8.34113E−10 | |

Figure 6:
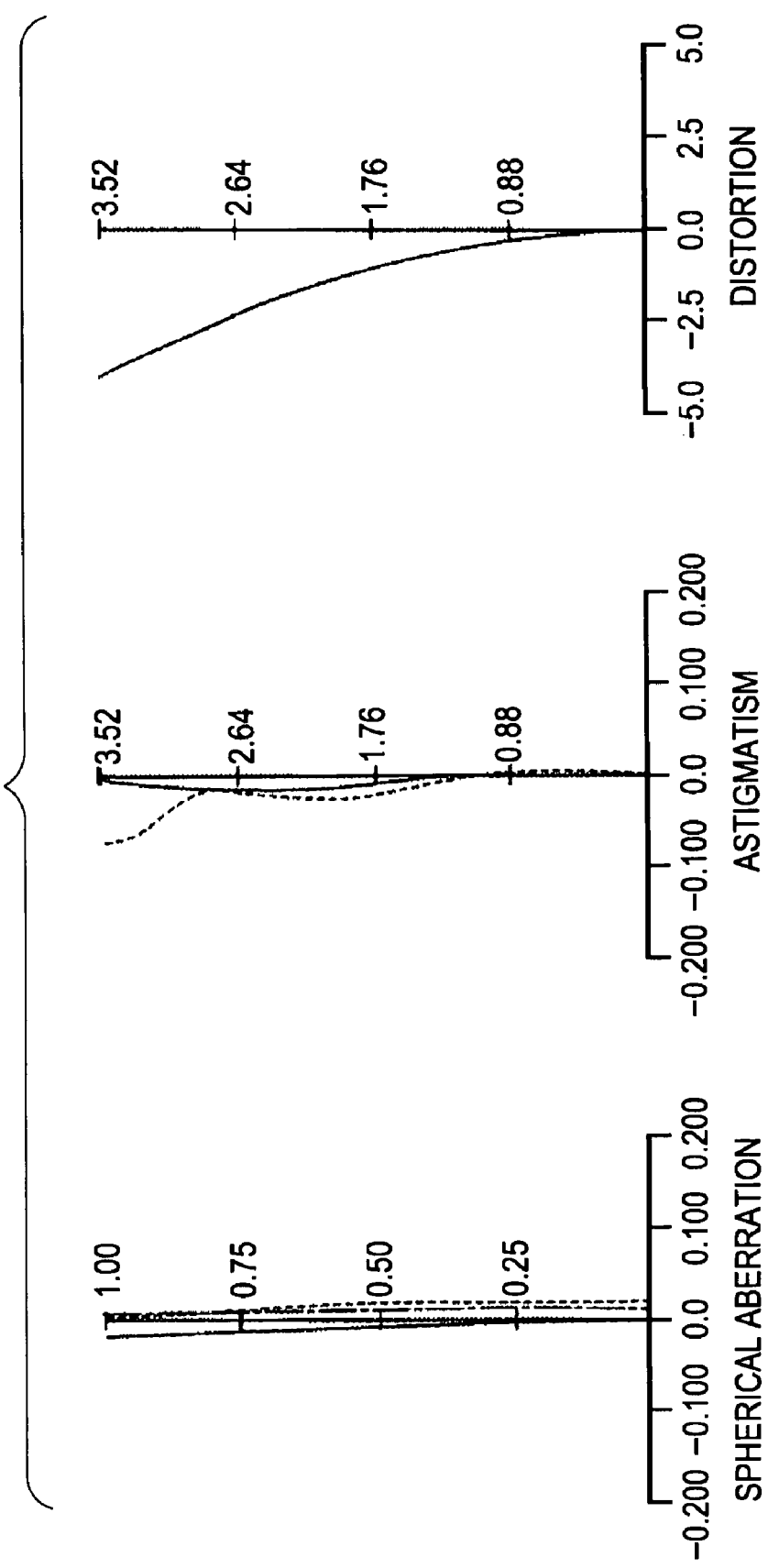
FIG. 6 illustrates aberration diagrams of spherical aberration, astigmatism and distortion at a wide-angle end state according to a second numerical example in which specific numerical values are applied to the zoom lens according to the second embodiment of the present invention.
Figure 7:
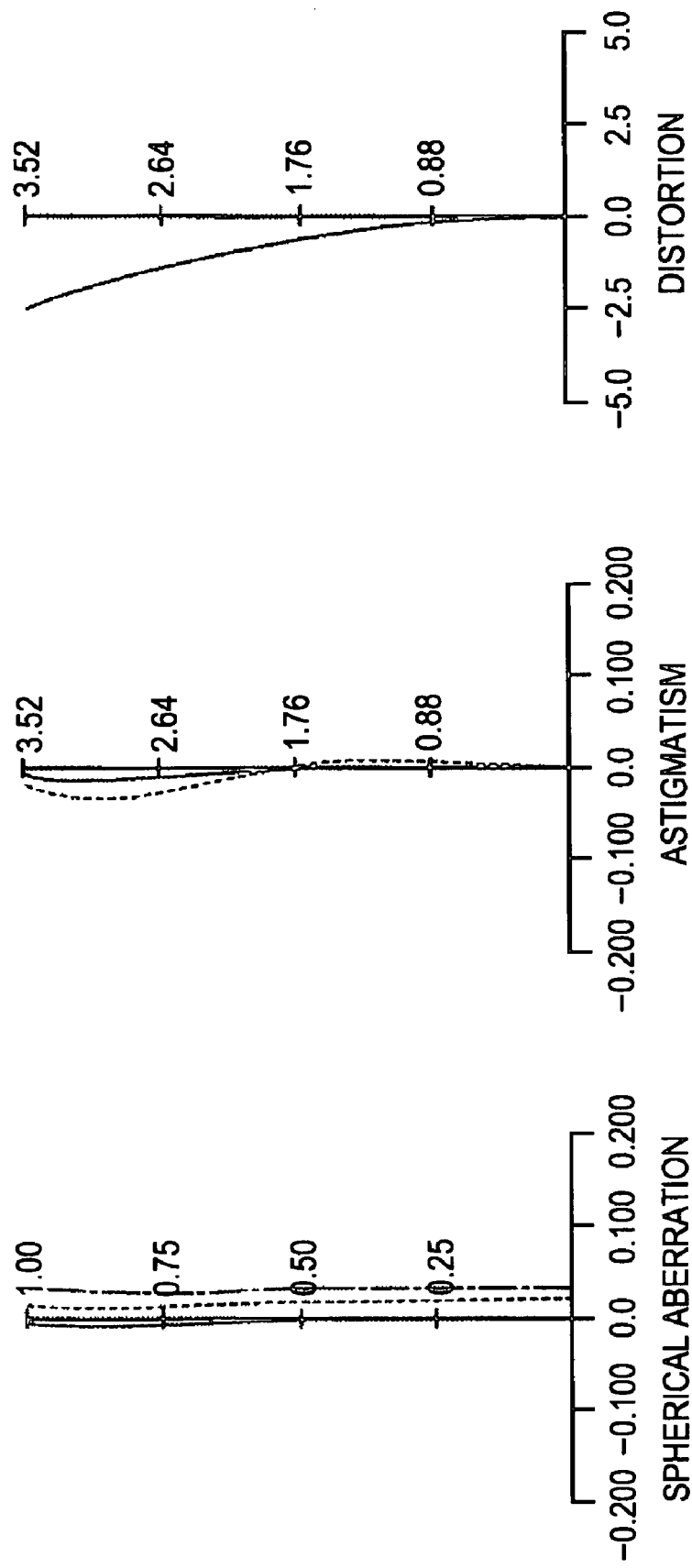
FIG. 7 illustrates aberration diagrams of spherical aberration, astigmatism and distortion at an intermediate zoom position according to the second numerical example.
Figure 8:
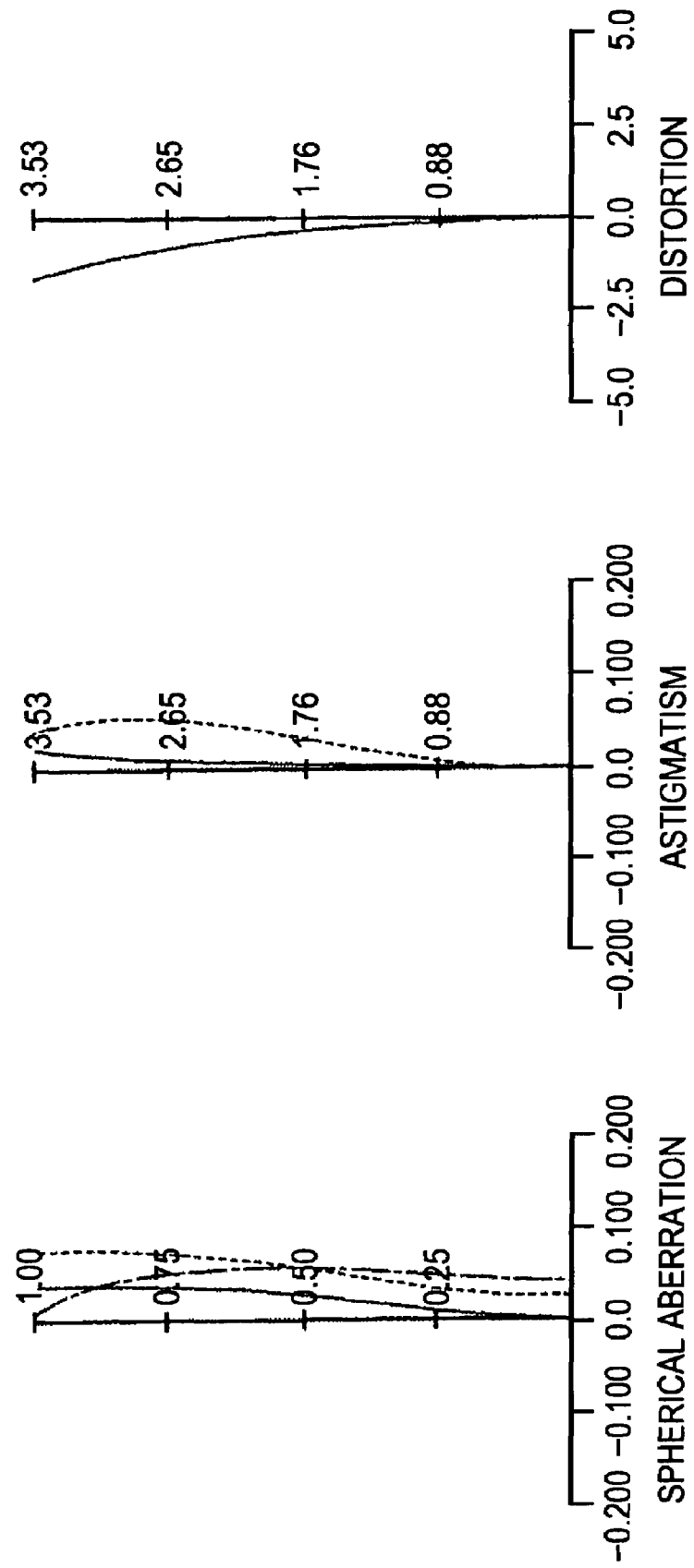
FIG. 8 illustrates aberration diagrams of spherical aberration, astigmatism and distortion at a telephoto end state according to the second numerical example.

FIGS. 6, 7 and 8 show aberration diagrams at infinity according to the second numerical example. FIG. 6 illustrates aberration diagrams at the wide-angle end state (f=5.80), FIG. 7 illustrates aberration diagrams at the intermediate zoom position (f=8.08), and FIG. 8 illustrates aberration diagrams at the telephoto end state (f=16.24).

In each of FIGS. 6, 7 and 8, the spherical aberration curves are plotted by a solid line for the d-line, a broken line for the C-line, and a dotted-chain line for the g-line. The astigmatism curves are plotted by a solid line for a sagittal image surface and a broken line for a meridional image surface.

Figure 9:
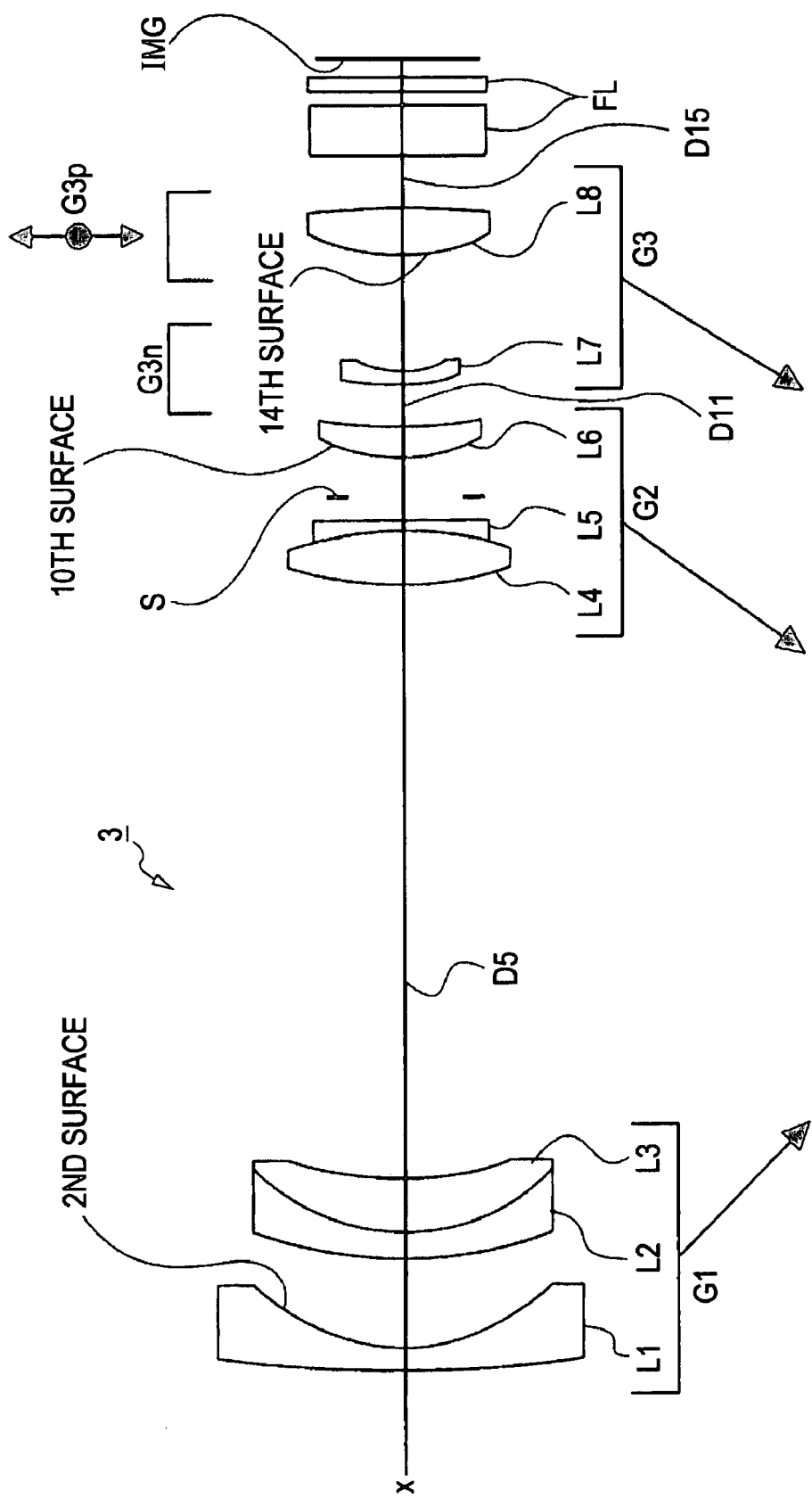
FIG. 9 is an illustration showing a lens arrangement of a zoom lens according to a third embodiment of the present invention.

FIG. 9 is an illustration showing a lens arrangement of a zoom lens 3 according to a third embodiment. A first lens group G1 includes a negative meniscus lens L1 having an aspherical surface at the image side and a convex surface at the object side and a cemented lens of a negative meniscus lens L2 having a convex surface at the object side and a positive meniscus lens L3 having a concave surface at the image side, the lenses being sequentially aligned from the object side. A second lens group G2 includes a cemented lens of a biconvex lens L4 and a negative meniscus lens L5 having a convex surface at the image side and a positive meniscus lens L6 having an aspherical surface at the image side and a convex surface at the object side, the lenses being sequentially aligned from the object side. A third lens group G3 includes a negative meniscus lens L7 having a convex surface at the object side and a biconvex lens L8 having an aspherical surface at the object side, the lenses being sequentially aligned from the object side. In the third lens group G3, the negative meniscus lens L7 defines a negative sub-lens group G3$n$ and the biconvex lens L8 defines a positive sub-lens group G3$p$. As the positive sub-lens group G3$p$ is shifted in a direction orthogonal to an optical axis x of the zoom lens 3, an image may be shifted.

An aperture stop S is disposed between the negative meniscus lens L4 and the positive meniscus lens L5 of the second lens group G2. Filters FL, such as a low-pass filter and an infrared cut filter, are disposed between the third lens group G3 and an image plane IMG.

Table 7 shows specific values of a third numerical example in which specific numerical values are applied to the third embodiment.

TABLE 7

| Surface No. | R | D | Nd | vd |
|---|---|---|---|---|
| 1 | 76.895 | 1.000 | 1.80610 | 40.7 |
| 2 | 8.722 ASP | 4.205 | | |
| 3 | 19.151 | 1.254 | 1.74330 | 49.2 |
| 4 | 9.310 | 2.500 | 1.84666 | 23.8 |
| 5 | 17.568 | D5 | | |
| 6 | 14.767 | 2.500 | 1.74330 | 49.2 |
| 7 | −16.300 | 0.450 | 1.84666 | 23.8 |
| 8 | −67.902 | 1.000 | | |
| 9 | Aperture Stop | 2.000 | | |
| 10 | 6.840 ASP | 1.353 | 1.58913 | 61.3 |
| 11 | 23.683 | D11 | | |
| 12 | 16.592 | 0.500 | 1.90366 | 29.5 |
| 13 | 5.281 | 5.460 | | |
| 14 | 8.626 ASP | 2.242 | 1.48749 | 70.4 |
| 15 | −149.678 | D15 | | |
| 16 | INF | 2.300 | 1.51680 | 64.2 |
| 17 | INF | 0.700 | | |
| 18 | INF | 0.500 | 1.51680 | 64.2 |
| 19 | INF | 1.000 | | |
| 20 | INF | | | |

A surface distance D5 between the first lens group G1 and the second lens group G2, a surface distance D11 between the second lens group G2 and the third lens group G3, and a surface distance D15 between the third lens group G3 and the filters FL are varied during zooming from the wide-angle end state to the telephoto end state. Table 8 shows values of the variable distances at a wide-angle end state (f=5.45), an intermediate zoom position (f=10.38), and a telephoto end state (f=20.71), together with F-numbers Fno, focal lengths f and half-field angles ω.

TABLE 8

| Fno. | 2.90 | 3.56 | 4.88 |
|---|---|---|---|
| f | 5.45 | 10.38 | 20.71 |
| ω | 34.35 | 19.16 | 9.78 |
| D5 | 27.966 | 10.810 | 1.195 |
| D11 | 2.201 | 2.736 | 4.157 |
| D15 | 2.589 | 7.216 | 15.548 |

A 2nd surface, a 10th surface, and a 14th surface each have an aspherical surface. Table 9 shows aspherical coefficients A4, A6, A8 and A10 at a 4th order, a 6th order, an 8th order and a 10th order of each surface, together with conic constants K.

TABLE 9

| Surface No. | | | |
|---|---|---|---|
| 2 | K = 0.00000E+00 | A4 = −1.16136E−04 | A6 = −1.42390E−06 |
| | A8 = 9.10122E−09 | A10 = −4.37520E−10 | |
| 10 | K = 0.00000E+00 | A4 = −1.30241E−04 | A6 = −1.80468E−06 |
| | A8 = −1.23733E−07 | A10 = 2.71888E−09 | |
| 14 | K = 0.00000E+00 | A4 = −1.83379E−04 | A6 = −1.79509E−06 |
| | A8 = 9.80836E−08 | A10 = −3.67018E−09 | |

Figure 10:
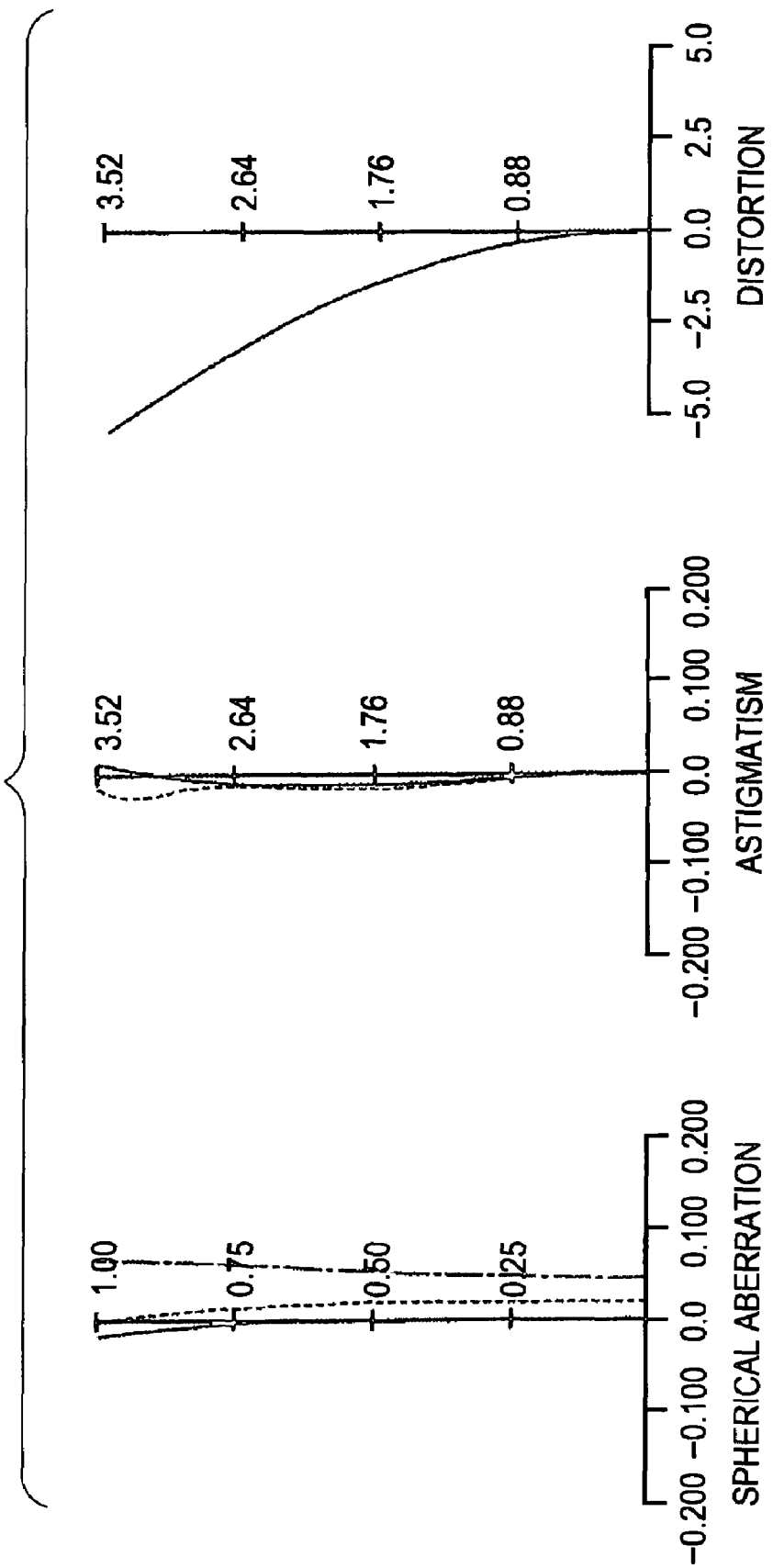
FIG. 10 illustrates aberration diagrams of spherical aberration, astigmatism and distortion at a wide-angle end state according to a third numerical example in which specific numerical values are applied to the zoom lens according to the third embodiment of the present invention.
Figure 11:
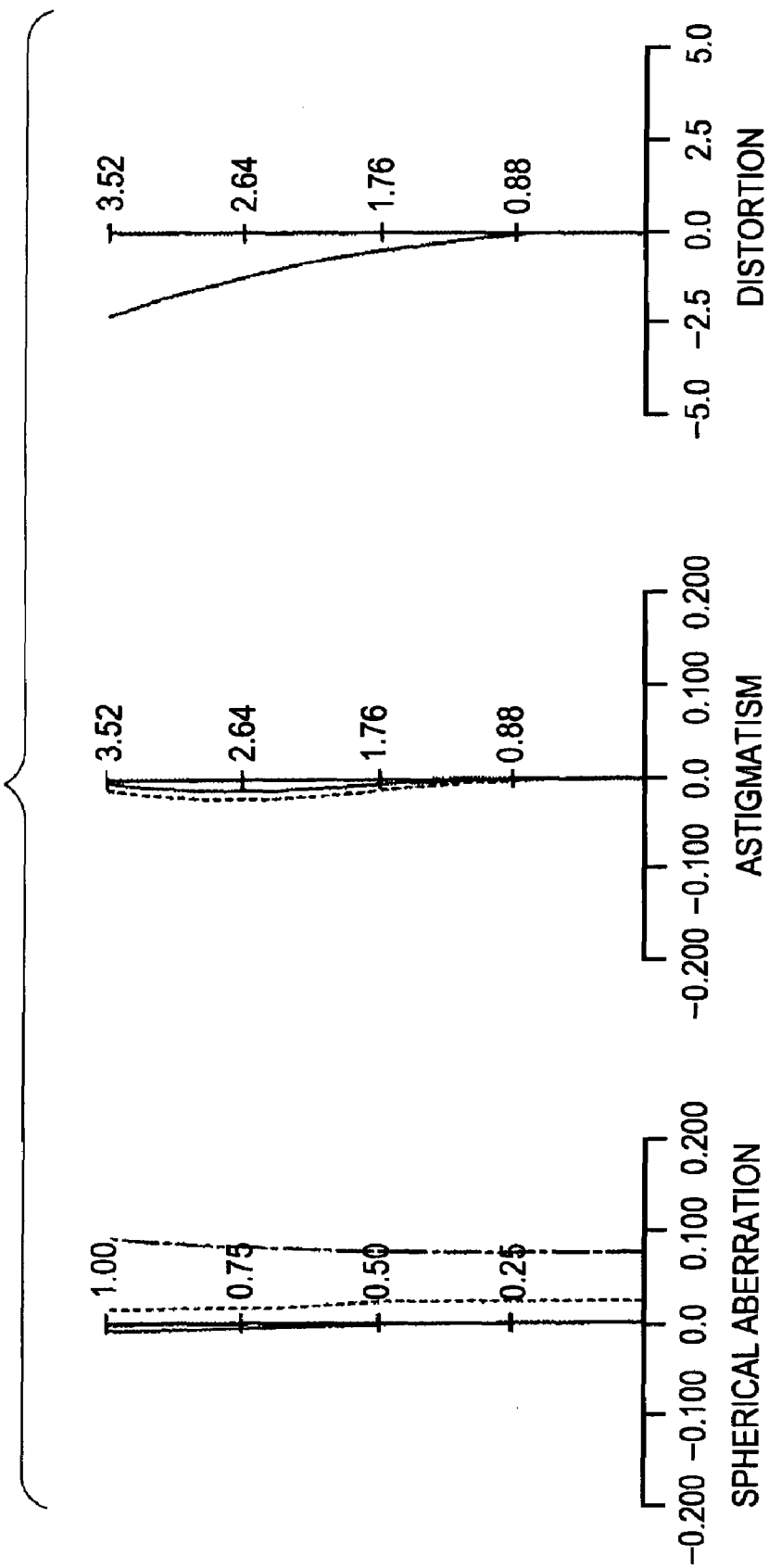
FIG. 11 illustrates aberration diagrams of spherical aberration, astigmatism and distortion at an intermediate zoom position according to the third numerical example.
Figure 12:
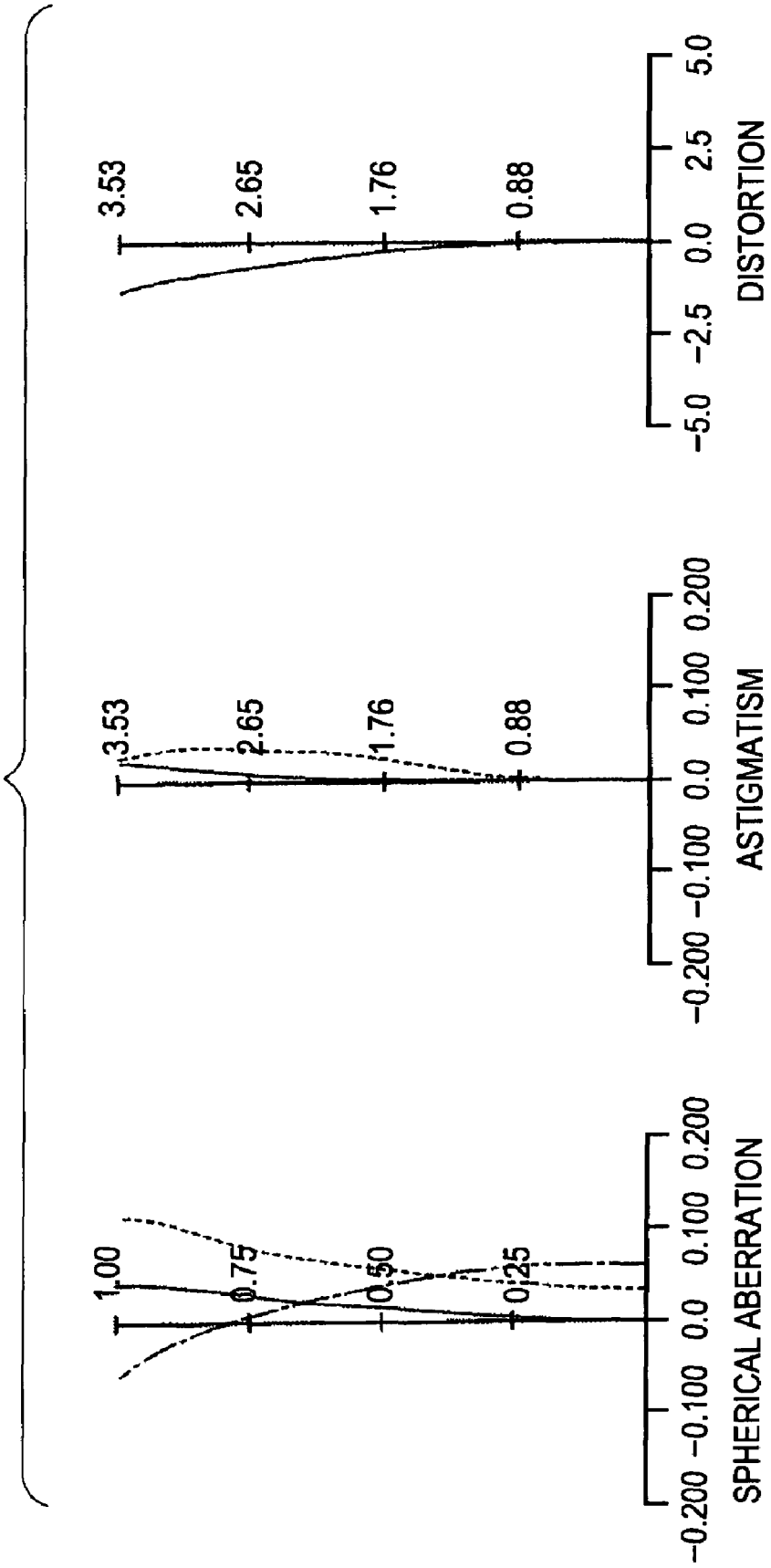
FIG. 12 illustrates aberration diagrams of spherical aberration, astigmatism and distortion at a telephoto end state according to the third numerical example.

FIGS. 10, 11 and 12 show aberration diagrams at infinity according to the third numerical example. FIG. 10 illustrates aberration diagrams at the wide-angle end state (f=5.45), FIG. 11 illustrates aberration diagrams at the intermediate zoom position (f=10.38), and FIG. 12 illustrates aberration diagrams at the telephoto end state (f=20.71).

In each of FIGS. 10, 11 and 12, the spherical aberration curves are plotted by a solid line for the d-line, a broken line for the C-line, and a dotted-chain line for the g-line. The astigmatism curves are plotted by a solid line for a sagittal image surface and a broken line for a meridional image surface.

In the third numerical example, the conditional expression (1) may be satisfied while a zoom ratio of 3.8 is provided. In addition, reliable characteristics similar to other numerical examples may be achieved.

Figure 13:
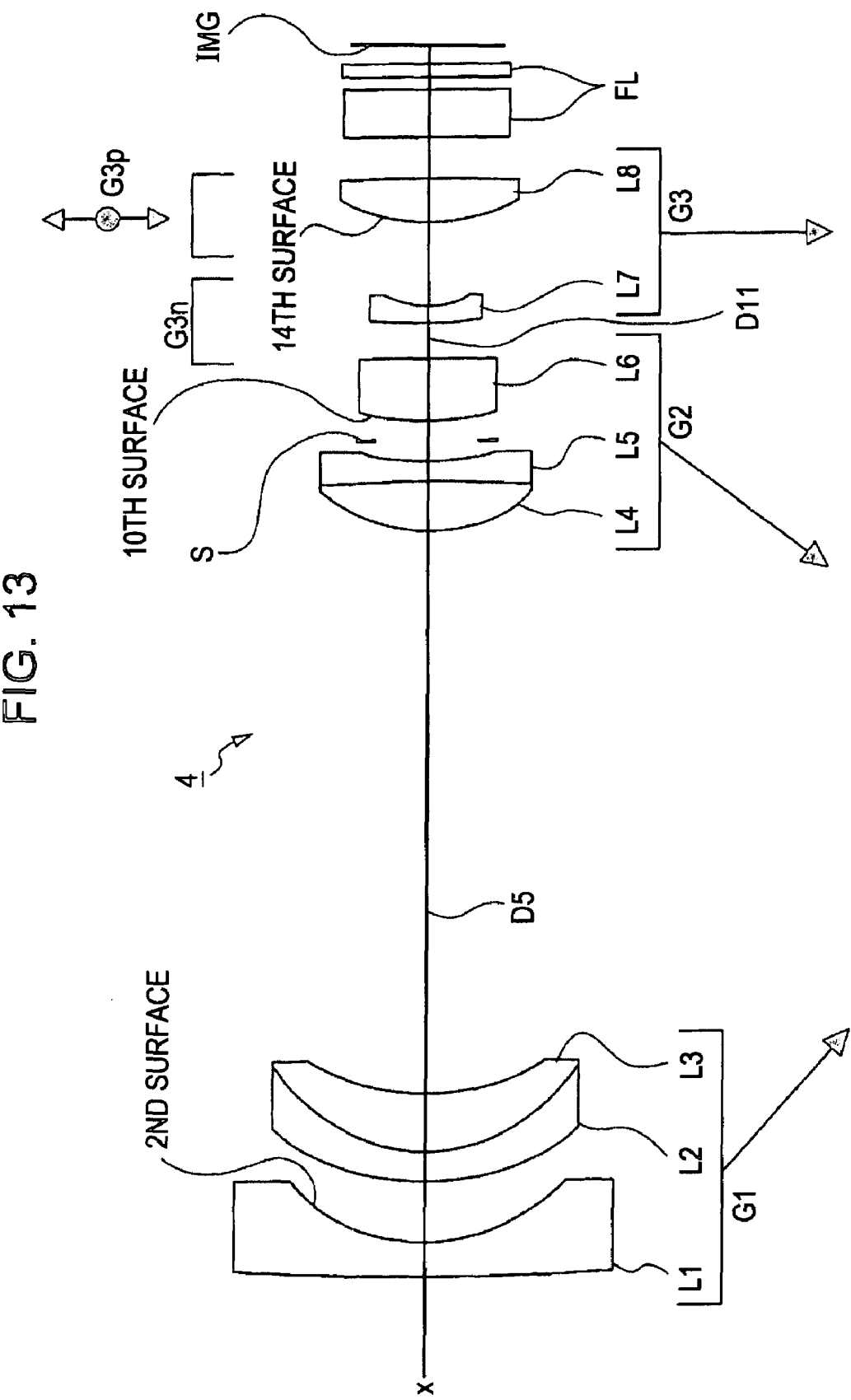
FIG. 13 is an illustration showing a lens arrangement of a zoom lens according to a fourth embodiment of the present invention.

FIG. 13 is an illustration showing a lens arrangement of a zoom lens 4 according to a fourth embodiment. A first lens group G1 includes a negative meniscus lens L1 having an aspherical surface at the image side and a convex surface at the object side and a cemented lens of a negative meniscus lens L2 having a convex surface at the object side and a positive meniscus lens L3 having a concave surface at the image side, the lenses being sequentially aligned from the object side. A second lens group G2 includes a cemented lens of a biconvex lens L4 and a biconcave lens L5 and a biconvex lens L6 having an aspherical surface at the object side the lenses being sequentially aligned from the object side. A third lens group G3 includes a negative meniscus lens L7 having a convex surface at the object side, and a biconvex lens L8 having an aspherical surface at the object side, the lenses being sequentially aligned from the object side. In the third lens group G3, the negative meniscus lens L7 defines a negative sub-lens group G3$n$ and the biconvex lens L8 defines a positive sub-lens group G3$p$. As the positive sub-lens group G3$p$ is shifted in a direction orthogonal to an optical axis x of the zoom lens 4, an image may be shifted.

An aperture stop S is disposed between the biconcave lens L5 and the biconvex L6 of the second lens group G2. Filters FL, such as a low pass filter and an infrared cut filter, are disposed between the third lens group G3 and an image plane IMG.

Table 10 shows specific values of a fourth numerical example in which specific numerical values are applied to the fourth embodiment.

TABLE 10

| Surface No. | R | D | Nd | vd |
|---|---|---|---|---|
| 1 | 220.116 | 1.700 | 1.76802 | 46.6 |
| 2 | 8.750 ASP | 3.000 | | |
| 3 | 12.545 | 1.500 | 1.72825 | 28.3 |
| 4 | 8.690 | 3.000 | 1.92286 | 20.9 |
| 5 | 12.553 | D5 | | |
| 6 | 7.839 | 2.500 | 1.71300 | 53.9 |
| 7 | −89.977 | 1.000 | 1.84666 | 23.8 |
| 8 | 17.156 | 1.000 | | |
| 9 | Aperture Stop | 1.072 | | |
| 10 | 11.408 ASP | 3.000 | 1.58913 | 61.3 |
| 11 | −91.089 | D11 | | |
| 12 | 22.489 | 1.000 | 1.63854 | 55.4 |
| 13 | 5.839 | 4.225 | | |
| 14 | 8.711 ASP | 2.180 | 1.48749 | 70.4 |
| 15 | −56.266 | 2.117 | | |
| 16 | INF | 2.300 | 1.51680 | 64.2 |
| 17 | INF | 0.700 | | |
| 18 | INF | 0.500 | 1.51680 | 64.2 |
| 19 | INF | 1.000 | | |
| 20 | INF | | | |

A surface distance D5 between the first lens group G1 and the second lens group G2 and a surface distance D11 between the second lens group G2 and the third lens group G3 are varied during zooming from the wide-angle end state to the telephoto end state. Table 11 shows values of the variable distances at a wide-angle end state (f=5.49), an intermediate zoom position (f=7.03), and a telephoto end state (f=15.66), together with F-numbers Fno, focal lengths f and half-field angles ω.

TABLE 11

| Fno. | 2.89 | 3.11 | 4.31 |
|---|---|---|---|
| f | 5.49 | 7.03 | 15.66 |
| ω | 34.00 | 27.17 | 12.46 |
| D5 | 28.000 | 20.275 | 5.091 |
| D11 | 1.625 | 2.597 | 8.116 |

A 2nd surface, a 10th surface, and a 14th surface each have an aspherical surface. Table 12 shows aspherical coefficients A4, A6, A8 and A10 at a 4th order, a 6th order, an 8th order and a 10th order of each surface, together with conic constants K.

TABLE 12

| Surface No. | | | |
|---|---|---|---|
| 2 | K = 0.00000E+00 | A4 = −1.30402E−04 | A6 = −1.13744E−06 |
| | A8 = 1.42352E−08 | A10 = −4.82316E−10 | |
| 10 | K = 0.00000E+00 | A4 = −5.49540E−04 | A6 = −9.31411E−06 |
| | A8 = 1.43193E−07 | A10 = −1.39597E−08 | |
| 14 | K = 0.00000E+00 | A4 = −2.44021E−04 | A6 = 2.16086E−05 |
| | A8 = −9.46570E−07 | A10 = 1.65544E−08 | |

Figure 14:
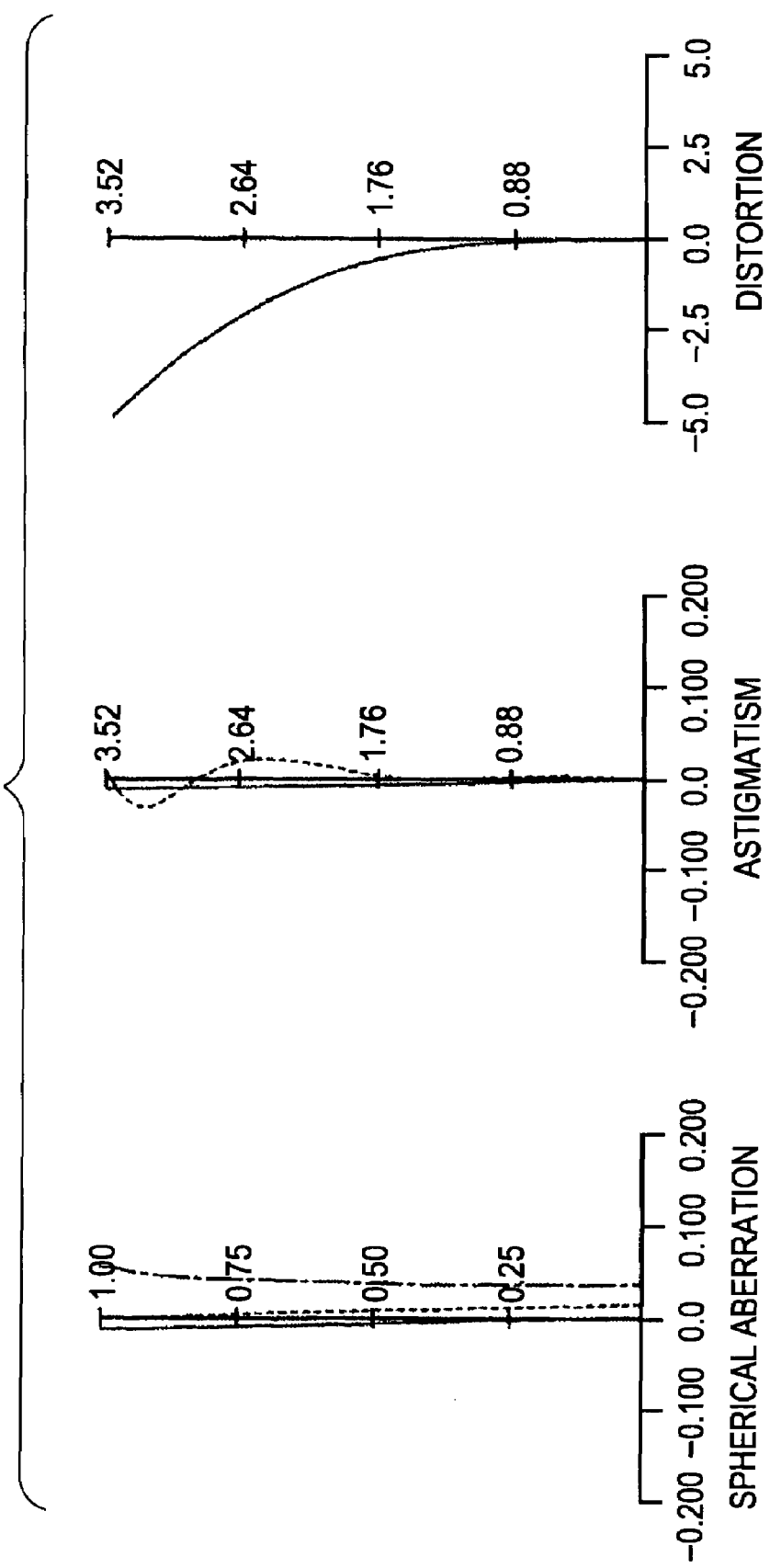
FIG. 14 illustrates aberration diagrams of spherical aberration, astigmatism and distortion at a wide-angle end state according to a fourth numerical example in which specific numerical values are applied to the zoom lens according to the fourth embodiment of the present invention.
Figure 15:
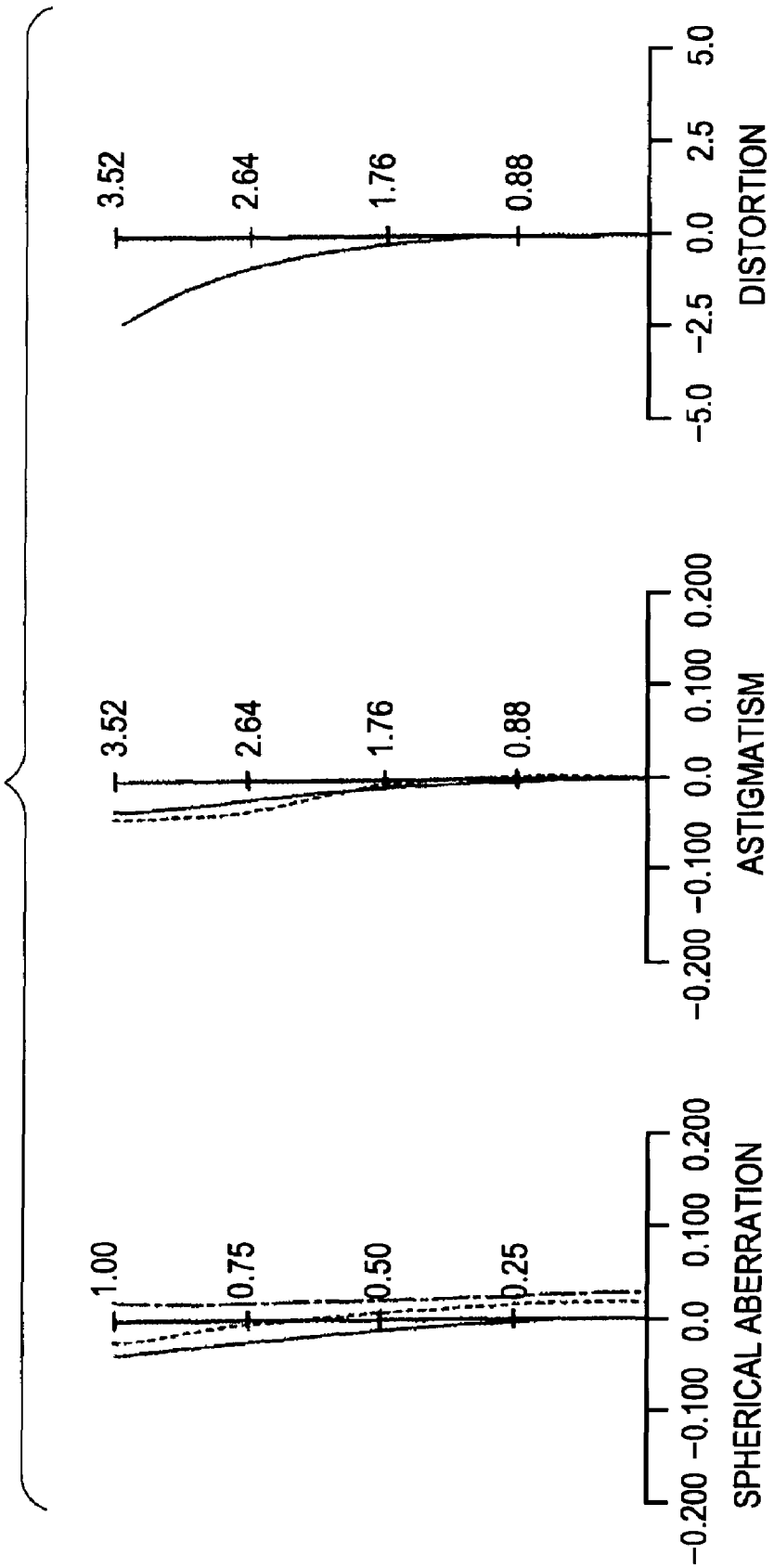
FIG. 15 illustrates aberration diagrams of spherical aberration, astigmatism and distortion at an intermediate zoom position according to the fourth numerical example.
Figure 16:
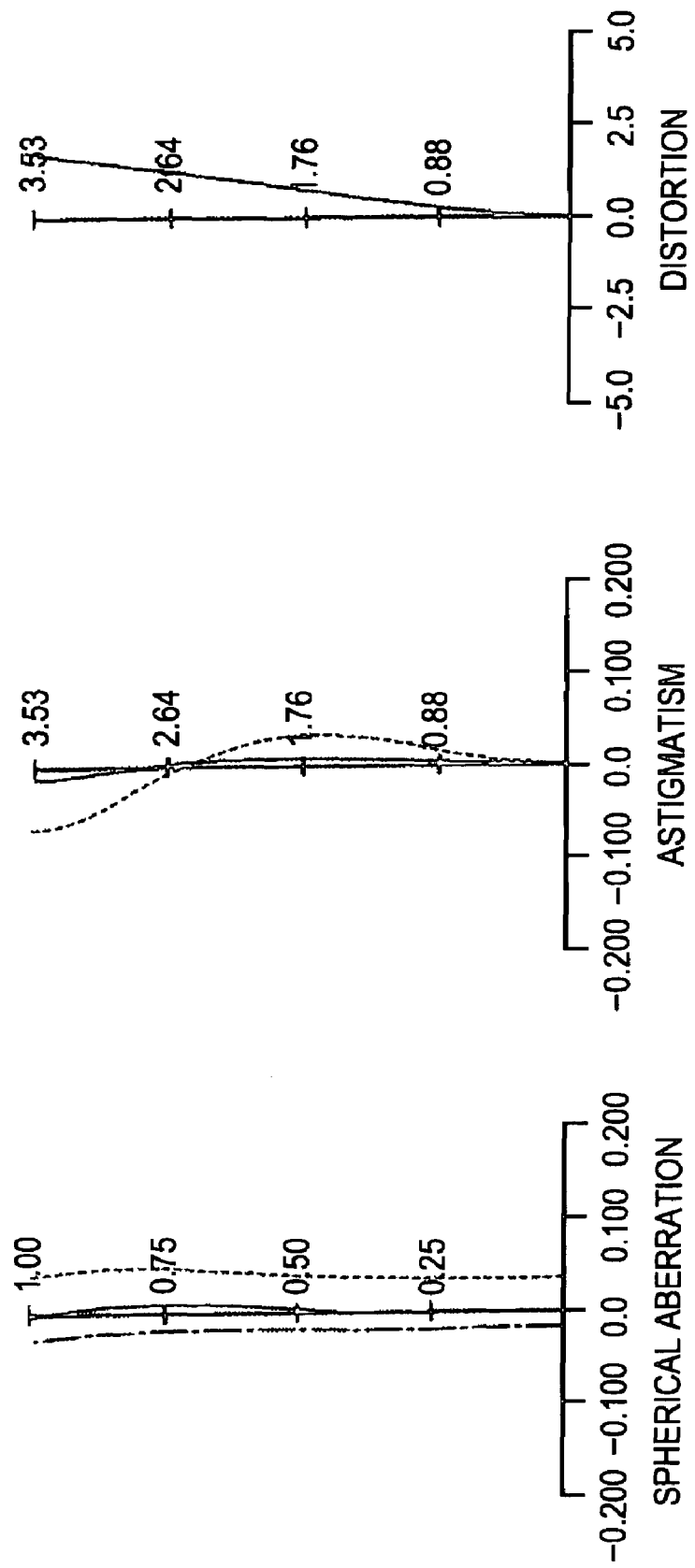
FIG. 16 illustrates aberration diagrams of spherical aberration, astigmatism and distortion at a telephoto end state according to the fourth numerical example.

FIGS. 14, 15 and 16 show aberration diagrams at infinity according to the fourth numerical example. FIG. 14 illustrates aberration diagrams at the wide-angle end state (f=5.49), FIG. 15 illustrates aberration diagrams at the intermediate zoom position (f=7.03), and FIG. 16 illustrates aberration diagrams at the telephoto end state (f=15.66).

In each of FIGS. 14, 15 and 16, the spherical aberration curves are plotted by a solid line for the d-line, a broken line for the C-line, and a dotted-chain line for the g-line. The astigmatism curves are plotted by a solid line for a sagittal image surface and a broken line for a meridional image surface.

In the fourth embodiment, while the third lens group G3 is fixed during zooming for simplifying the zoom mechanism, reliable characteristics similar to other embodiments may be attained.

Table 13 shows values corresponding to the conditional expressions (1), (2) and (3) in relation to the above-described numerical examples.

TABLE 13

| | First Numerical Example | Second Numerical Example | Third Numerical Example | Fourth Numerical Example |
|---|---|---|---|---|
| Conditional Expression (1) [0.3 < (1 − βa) × βb < 2] | 0.973 | 1.013 | 1.224 | 0.444 |
| Conditional Expression (2) [0.5 < Rn/fw < 1.5] | 0.860 | 0.915 | 0.960 | 1.062 |
| Conditional Expression (3) [−1.0 < (CF + CR)/(CF − CR) < 0] | −0.833 | −0.572 | −0.891 | −0.732 |

Figure 17:
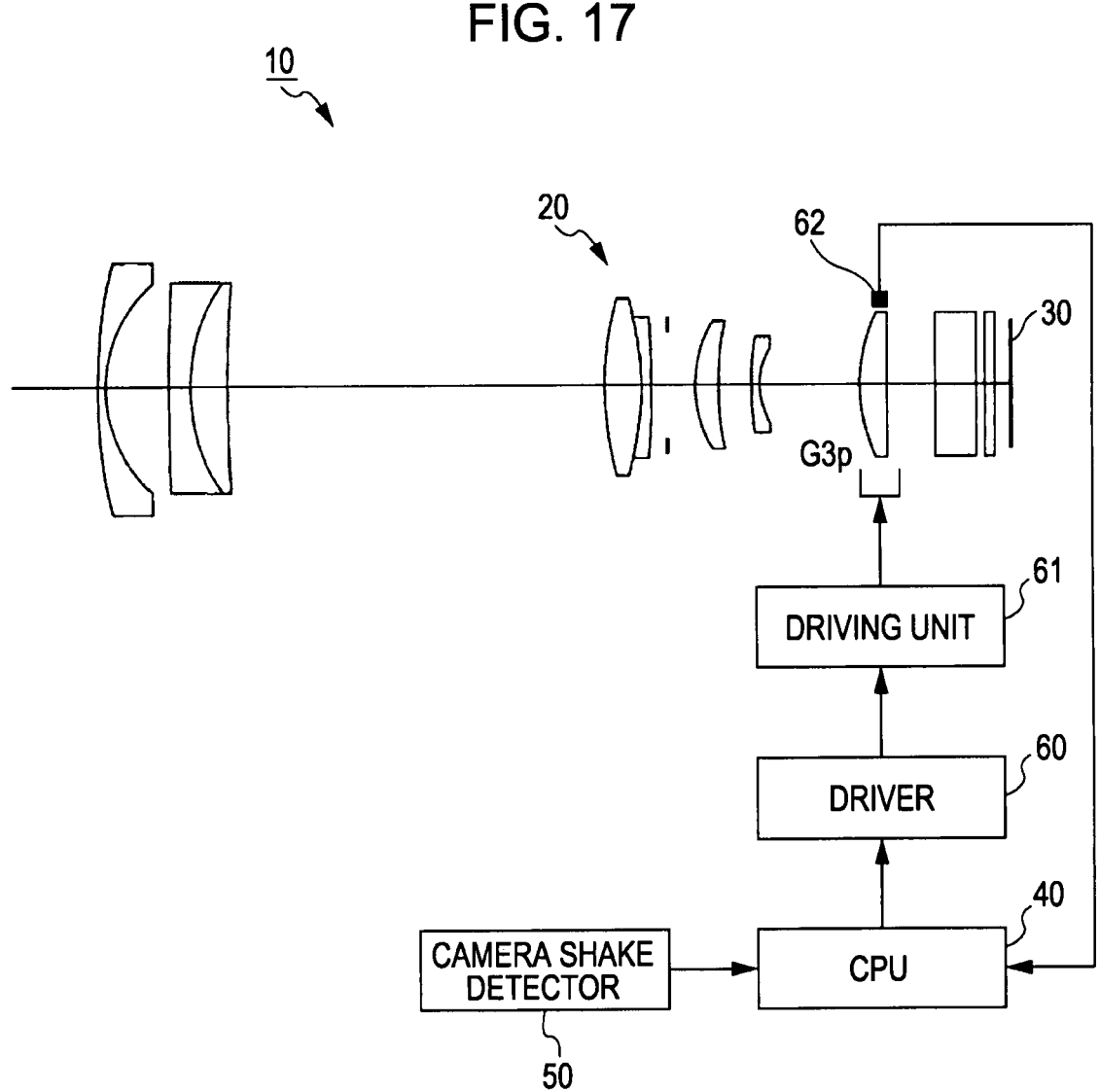
FIG. 17 is a block diagram showing an image pickup apparatus according to an embodiment of the present invention.

FIG. 17 shows an image pickup apparatus according to an embodiment of the present invention.

An image pickup apparatus 10 includes a zoom lens 20, an image pickup device 30 that converts an optical image produced by the zoom lens 20 into an electric signal, a camera shake detector 50 that detects shake of the main body of the image pickup device 30, and an image stabilization controller that controls variation in position of an object image to be produced, by driving a driver to move the image stabilization lens group (G3p) of the zoom lens 20 in the direction orthogonal to the optical axis of the zoom lens 20 in accordance with the shake of the main body of the image pickup device 30 detected by the camera shake detector 50. For example, the image pickup device 30 may employ a photoelectric converter, such as a CCD (Charge Coupled Device) or CMOS (Complementary Metal-Oxide Semiconductor). The zoom lens 20 may employ the zoom lens according to the embodiments of the present invention. In FIG. 17, the zoom lens 1 according to the first embodiment that is shown in FIG. 1 is presented. However, it is obvious that the zoom lens 20 is not limited to the zoom lens 1 according to the first embodiment, and it may be selected from other the zoom lenses 2 to 4 according to the second to fourth embodiments, or other zoom lenses having a configuration not relying upon the embodiments described in this specification.

A control circuit 40 (CPU) calculates a shake angle for correcting the camera shake by using a signal from the camera shake detector 50, for instance, a gyro sensor, which detects the shake of the main body of the image pickup device 30. A driving unit 61 (driver) is operated through a driver circuit 60 (image stabilization controller) to move the image stabilization lens group G3p to a predetermined position corresponding to the calculated shake angle. A sensor 62 obtains position information of the image stabilization lens group G3p. The image information is input to the control circuit 40 and is referred when an instruction signal is output to the driver circuit 60. The above-described image pickup apparatus 10 may be any type of commercially available product. For example, the image pickup apparatus 10 may be widely applied to a camera of a digital I/O apparatus, such as a digital still camera, a digital video camera, a mobile phone with a camera mounted therein, and a PDA (Personal Digital Assistant) with a camera mounted therein.

Note that the specific profiles, configurations, numerical values of each component described in the embodiments and numerical examples are merely examples for implementing the present invention, and the technical scope of the present invention is not limited by these examples.

It should be understood by those skilled in the art that various modifications, combinations, subcombinations and alterations may occur depending on design requirements and other factors insofar as they are within the scope of the appended claims or the equivalents thereof.

What is claimed is:

1. A zoom lens comprising:
   a first lens group having a negative refractive power;
   a second lens group having a positive refractive power; and
   a third lens group having a positive refractive power, wherein
   the lens groups are sequentially aligned from an object side,
   the first lens group is moved along an optical axis of the zoom lens and the second lens group is moved along the optical axis toward the object side, during zooming from a wide-angle end state to a telescopic end state,
   the third lens group includes a negative sub-lens group having a negative refractive power, and a positive sub-lens group having a positive refractive power, the sub-lens groups being sequentially aligned from the object side, an image being able to be shifted by moving the positive sub-lens group in a direction orthogonal to the optical axis, and
   the following conditional expression (1) is satisfied, $$0.3 < 1 - \beta < 2.5, \quad (1)$$

where $\beta$ is a magnification of the positive sub-lens group of the third lens group at the telescopic end state.

2. The zoom lens according to claim 1, wherein the negative sub-lens group of the third lens group satisfies the following conditional expression (2), $$1.0 < Rn/fw < 1.5, \quad (2)$$

where $Rn$ is a curvature radius of a lens surface closest to an image side of the negative sub-lens group of the third lens group, and $fw$ is a focal length of a whole lens system at a wide-angle end state.

3. The zoom lens according to claim 1, wherein the positive sub-lens group of the third lens group satisfies the following conditional expression (3), $$-1.0 < (CF+CR)/(CF-CR) < 0, \quad (3)$$

where $CF$ is a curvature radius of a lens surface closest to the object side of the positive sub-lens group of the third lens group, and $CR$ is a curvature radius of a lens surface closest to the image side of the positive sub-lens group of the third lens group.

4. The zoom lens according to claim 1, wherein the positive sub-lens group of the third lens group includes a positive lens.

5. An image pickup apparatus comprising:
   a zoom lens; and
   an image pickup device that converts an optical image produced by the zoom lens into an electric signal, wherein
   the zoom lens includes a first lens group having a negative refractive power, a second lens group having a positive refractive power, and a third lens group having a positive refractive power, the lens groups being sequentially aligned from an object side, the first lens group being moved along an optical axis and the second lens group being moved along the optical axis toward the object side during zooming from a wide-angle end state to a telescopic end state,
   the third lens group includes a negative sub-lens group having a negative refractive power, and a positive sub-lens group having a positive refractive power, the sub-lens groups being sequentially aligned from the object side, an image being able to be shifted by moving the positive sub-lens group in a direction orthogonal to the optical axis, and
   the following conditional expression (1) is satisfied, $$0.3 < 1 - \beta < 2.5, \quad (1)$$

where $\beta$ is a magnification of the positive sub-lens group of the third lens group at the telescopic end state.

* * * * *